United States Patent
Matsuzaki et al.

[11] Patent Number: 5,877,433
[45] Date of Patent: Mar. 2, 1999

[54] BEARING PRELOAD MEASURING METHOD AND APPARATUS

[75] Inventors: Hiroyuki Matsuzaki; Hisakazu Tadokoro, both of Kanagawa, Japan

[73] Assignee: NSK Ltd., Tokyo, Japan

[21] Appl. No.: 863,201

[22] Filed: May 27, 1997

[30] Foreign Application Priority Data

| May 27, 1996 | [JP] | Japan | 8-152906 |
| May 9, 1997 | [JP] | Japan | 9-134455 |

[51] Int. Cl.[6] ............................................. G01L 5/00
[52] U.S. Cl. ................................. 73/862.381; 73/862.01
[58] Field of Search ............................... 73/862, 862.01, 73/862.381; 29/898.09

[56] References Cited

U.S. PATENT DOCUMENTS

| 3,100,989 | 8/1963 | Jones | 73/862.381 |
| 3,287,966 | 11/1966 | Haan et al. | 73/862.321 |
| 3,665,758 | 5/1972 | Tiller | 73/862.381 |
| 5,423,218 | 6/1995 | Matsuzaki | 73/593 |
| 5,509,198 | 4/1996 | Takamizawa et al. | 29/898.09 |

FOREIGN PATENT DOCUMENTS

| 2-61700 | 12/1990 | Japan | G01M 13/04 |
| 5-10835 | 1/1993 | Japan | G01L 5/00 |
| 7-127634 | 5/1995 | Japan | F16C 19/08 |
| 2 286 231 | 8/1995 | United Kingdom | F16C 43/04 |

*Primary Examiner*—Ronald Biegel
*Attorney, Agent, or Firm*—Sughrue, Mion, Zinn, Macpeak & Seas, PLLC

[57] ABSTRACT

In a duplex bearing 10 in which a preload is applied to balls 14a and 14b interposed between an outer race 11 and first and second inner races 12 and 13 by tightening a nut 16, a preload jig 19 fitted to the lower end of the second inner race 13 is turned by a motor 21 and applied with an axial load by a rod 31. The rod 31 has a load detector 31 at the middle. Position sensors 24 and 25, each of which is adapted to detect an amount of displacement in the direction of axis, are provided at the ends of the outer race 11 and the second inner race 13, respectively. A rotation detecting sensor 33 adapted to detect a rotational position is provided below the lower surface of the preload jig 9. Under the condition that the axial load is applied to the extent that measuring loads are FH and FL, the amounts of average displacement XAH and XAL of the outer race 11, and the amounts of average displacement XBH and XBL are detected, and the amounts of displacement $\Delta XH$ and $\Delta XL$ which are the differences between those amounts are calculated, so that the aimed rigidity KA is calculated by utilizing the amounts of displacement $\Delta XH$ and $\Delta XL$ thus calculated.

12 Claims, 10 Drawing Sheets

BEARING PRELOAD MEASURING METHOD AND APPARATUS

BACKGROUND OF THE INVENTION

This invention relates to a bearing preload measuring method and apparatus adapted to measure the rigidity of a double row bearing or duplex bearing in which a negative gap is formed by a preload.

Heretofore, a double row bearing or a duplex bearing to which a preload is applied by tightening a nut when it is assembled, must be high in rigidity in view of the performance of a machine to which the bearing is applied. However, if an amount of preload is increased thereby to excessively increase the rigidity, then the preload is excessively increased, which lowers the performance of the bearing (the frictional moment is increased, heat is abnormally generated, or a fatigue life is decreased). Hence, the rigidity of the bearing must be controlled in a predetermined range while being related to the amount of preload.

Examples of the bearing preload measuring apparatus, which are known in the art, are as follows: Japanese Patent Unexamined Publication No. 10835/1993 has disclosed a bearing preload measuring apparatus in which a vibration signal generated by a rotating bearing is subjected to frequency analysis, to obtain the contact angle a of the rolling element and the resonance frequency fa, and those data, namely, the contact angle $\alpha$ and the resonance frequency fa are utilized to obtain a bearing rigidity Ka and an amount of preload Fa.

Japanese Patent Examined Publication No. 61700/1990 has disclosed the following bearing preload measuring apparatus. In the apparatus, the vibration applied to a bearing box or a shaft by a vibrating machine is detected with a speed or acceleration sensor, and the detection signal is amplified by an amplifier and analyzed with a frequency analyzer to detect the resonance frequency of the bearing. The relation between the resonance frequency thus detected and the amount of preload is obtained according to the finite element method in advance, so that the amount of preload is detected from the resonance frequency.

Japanese Patent Unexamined Publication No. 127634/1995 has disclosed the following technique: In assembling a bearing, at the time of temporarily pressing the inner race in the bearing body, a bearing axial gap and a dimension A in the direction of axis between the large-diameter end face of the inner race and the reference surface of an axle are measured. After the inner race has been pressed in the bearing body, the dimension B between the large-diameter end face of the inner race and the reference surface of the axle, whereby the negative bearing axial gap provided after the inner race has been pressed in the bearing body; that is, the initial gap provided before the nut is tightened can be obtained.

The above-described techniques of Japanese Patent Unexamined Publication No. 10835/1993 and Japanese Patent Examined Publication No. 61700/1990 are based on resonance. Hence, if, in the measurement of the rigidity of a duplex bearing, the rigidity is relatively low, then no problem is involved; however, if the rigidity is high, then it is difficult to separate the vibration mode of the structure and the vibration mode due to the elasticity of the bearing from each other. On the other hand, a bearing such as a flanged bearing which has a part low in rigidity suffers from the same problem even if it is a single bearing. In the case of a bearing which must be high in rigidity, it is difficult to accurately measure the rigidity on the basis of the resonance frequency.

The above-described Japanese Patent Unexamined Publication No. 127634/1995 is also disadvantageous in the following point. If, in the case where, by tightening the nut, a preload is applied to the bearing in which the negative gap has been formed, the amount of decrease in gap can be sufficiently controlled, then the measurement of the initial gap is effective. In the case where it is estimated that the amount of gap decrease is fluctuated, it is necessary to evaluate the amount of decrease in gap after the nut is tightened. However, with the method in which the initial gap provided before the nut is tightened is measured, it is difficult to evaluate the amount of decrease in gap after the nut is tightened.

SUMMARY OF THE INVENTION

In view of the foregoing, an object of the invention is to provide a bearing preload measuring method and apparatus which is able to correctly measure the rigidity of a bearing which must be high in rigidity, after the nut is tightened.

The foregoing object of the invention has been achieved by the provision of a bearing preload measuring method for measuring a preload of a bearing which is assembled by applying in an axial direction the preload onto at least one of the top surface and the bottom surface thereof, wherein the bearing is one of a duplex bearing and a double row bearing, the method comprising the steps of;

applying in the axial direction a first relative measuring load (FH) between the inner and outer races;

measuring an amount of first relative displacement ($\Delta$XH) in the axial direction between the inner race and the outer race which is generated by the first relative measuring load (FH);

applying in the axial direction a second relative measuring load (FL) between the inner and outer races, the second relative measuring load (FL) being different in magnitude from the first relative measuring load (FL);

measuring an amount of second relative displacement ($\Delta$XL) in the axial direction between the inner race and the outer race which is generated by tho second relative measuring load (FL);

calculating a difference of displacement in the axial direction between the amount of the first relative displacement ($\Delta$XH) and the amount of the second relative displacement ($\Delta$XL); and calculating a preload of the bearing according to the difference of displacement in the axial direction through a comparative predetermined relationship between an axial load applied onto one of the duplex bearing and the double raw bearing and an axial displacement of the one which is generated by the application of the axial load.

In the above-mentioned bearing preload measuring method, the inner race and the outer race may be relatively rotated while the first measuring load (FH) and the second measuring load (FL) are being applied.

In the above-mentioned bearing preload measuring method, the second measuring load (FL) may be set on a value defined by a practical usage of the bearing.

In addition, the foregoing object of the invention has been achieved by the provision of a bearing preload measuring method for measuring a preload of a bearing in which a negative gap is formed by applying a preload to rolling elements in an axial direction which are interposed between an inner race and an outer race thereof, wherein the bearing is one of a duplex bearing and a double row bearing, the method comprising the steps of:

applying in the axial direction a first relative measuring load (FH) between the inner and outer races;

measuring an amount of first relative displacement ($\Delta$XH) in the axial direction between the inner race and the outer race which is generated by the first relative measuring load (FH);

applying in the axial direction a second relative measuring load (FL) between the inner and outer races, the second relative measuring load (FL) being different in magnitude from the first relative measuring load (FL);

measuring an amount of second relative displacement ($\Delta$XL) in the axial direction between the inner race and the outer race which is generated by the second relative measuring load (FL);

calculating a difference of displacement in the axial direction between the amount of the first relative displacement ($\Delta$XH) and the amount of the second relative displacement ($\Delta$XL);

calculating a rigidity (KA) of the bearing according to the difference thus calculated; and calculating a preload (Fa) of the bearing according to the rigidity (KA) thus calculated and a contact angle ($\alpha$) of the rolling elements.

In the above-mentioned bearing preload measuring method, the contact angle ($\alpha$) may be a prescribed value in a standard of the bearing.

In the above-mentioned bearing preload measuring method, one of the inner race and the outer race may be a stationary ring, the other one may be a rotary ring, and the rolling elements may be disposed between the stationary ring and the rotary ring, the method may further comprises the steps of:

applying a third relative measuring load in the axial direction between the stationary ring and the rotary ring;

detecting a vibration of the stationary ring which is occurred by rotation of the rotary ring and orbital revolutions of the rolling elements and outputting a vibration signal in accordance with the vibration thus detected while the rotary ring is being rotated relative to the stationary ring;

analyzing a spectrum frequency according to the vibration signal so as to obtain an orbital revolution frequency (fc) of the rolling element and a rotation frequency (fr) of the rotary ring;

calculating the contact angle ($\alpha$) of the bearing from the orbital revolution frequency (fc) and the rotation frequency (fr); and adapting the contact angle ($\alpha$) thus calculated to the step of calculating the preload (Fa) of the bearing.

In the bearing preload measuring method may be modified in such a manner that the bearing comprises a first and second bearing portions, each of the first and second bearing portions comprises the inner race and the outer race, one of the inner race and the outer race is a stationary ring, the other one is a rotary ring, and the rolling elements are disposed between the stationary ring and the rotary ring, in which the method further comprising the steps of:
applying a third relative measuring load in the axial direction between the stationary ring and the rotary ring;

detecting a vibration of the stationary ring which is occurred by rotation of the rotary ring and orbital revolutions of the rolling elements and outputting a vibration signal in accordance with the vibration thus detected while the rotary ring is being rotated relative to the stationary ring;

analyzing a spectrum frequency according to the vibration signal so as to obtain an orbital revolution frequency (fc) of the rolling element and a rotation frequency (fr) of the rotary ring;

applying a fourth relative measuring load (F2) larger than the third relative measuring load (F1) in the axial direction between the stationary ring and the rotary ring;

additionally analyzing a spectrum frequency according to the orbital revolution frequency (fc) so as to obtain a first orbital revolution frequency (fc1) of the first bearing portion and a second orbital revolution frequency (fc2) of the second bearing portion;

calculating a first contact angle ($\alpha$1) of the first bearing portion and a second contact angle ($\alpha$2) of the second bearing portion on the basis of the third relative measuring load (F1), the first orbital revolution frequency (fc1), the second orbital revolution frequency (fc2) and the rotation frequency (fr) of the rotary ring; and adapting at least one of the first contact angle ($\alpha$1), the second contact angle ($\alpha$2) to the step of calculating the preload (Fa) of the bearing as the contact angle ($\alpha$).

In the above-mentioned bearing preload measuring method, the measuring step of the amount of first relative displacement ($\Delta$XH), and the measuring step of the amount of second relative displacement ($\Delta$XL) may be conducted while the inner race and the outer race are relatively rotated.

Further, the foregoing object of the invention has been achieved by the provision of a bearing preload measuring apparatus adapted to measure the preload of a bearing in which a negative gap is formed by applying a preload to rolling elements in the direction of axis which are interposed between an inner race and an outer race, wherein the bearing is one of a duplex bearing and a double row bearing, the apparatus comprising:

load setting member for setting a first relative measuring load and a second relative measuring load;

pressurizing member for applying the first and second relative measuring loads between the inner and outer races to increase and decrease the negative gap;

a displacement detecting member for detecting an amount of first relative displacement between the inner and outer races in an axial direction while the first relative measuring loads are being applied and also detecting an amount of second relative displacement between the inner and outer races in an axial direction while the second relative measuring loads are being applied;

displacement difference calculating member for calculating a differrence between the amounts of first and second relative displacement in the axial direction;

rigidity calculating member for calculating a rigidity of the bearing according to the difference thus calculated; and a preload calculating member for calculating a preload (Fa) of the bearing according to the rigidity (KA) thus calculated and a contact angle ($\alpha$) of the rolling elements.

In the above-mentioned bearing preload measuring apparatus, the contact angle ($\alpha$) may be a prescribed value in a standard of the bearing.

In the above-mentioned bearing preload measuring apparatus may further includes a member for calculating the contact angle ($\alpha$) which comprises:

load setting member for setting a third relative measuring load;

member for applying the third relative measuring load in the axial direction between the inner race and the outer race;

member for relatively rotating one of the inner race and the outer race in such a manner that the one of the inner race and the outer race defines a stationary ring and the other one defines a rotary ring;

member mounted on the stationary ring for detecting a vibration of the stationary ring which is occurred by both a rotation of the rotary ring and orbital revolutions of the rolling elements and outputting a vibration signal in accordance with the vibration thus detected while the rotary ring is being rotated relative to the stationary ring;

member for analyzing a spectrum frequency according to the vibration signal so as to obtain an orbital revolution frequency,(fc) of the rolling element and a rotation frequency (fr) of the rotary ring;

member for calculating the contact angle ($\alpha$) of the bearing from the orbital revolution frequency (fc) and the rotation frequency (fr); and member for adapting the contact angle ($\alpha$) calculated by the calculating member to the preload calculating member.

The above-mentioned bearing preload measuring apparatus may be modified in such a manner that the bearing comprises a first and second bearing portions, each of the first and second bearing portions comprises the inner race and the outer race, one of the inner race and the outer race is a stationary ring, the other one is a rotary ring, and the rolling elements are disposed between the stationary ring and the rotary ring, in which the apparatus further includes a member for calculating the contact angle ($\alpha$) which comprises:

load setting member for setting a third relative measuring load;

member for applying the third relative measuring load in the axial direction between the inner race and the outer race;

member for relatively rotating one of the inner race and the outer race in such a manner that the one of the inner race and the outer race defines a stationary ring and the other one defines a rotary ring;

member mounted on the stationary ring for detecting a vibration of the stationary ring which is occurred by both a rotation of the rotary ring and orbital revolutions of the rolling elements and outputting a vibration signal in accordance with the vibration thus detected while the rotary ring is being rotated relative to the stationary ring;

member for analyzing a spectrum frequency according to the vibration signal so as to obtain an orbital revolution frequency (fc) of the rolling element and a rotation frequency (fr) of the rotary ring;

additional load setting member for setting a fourth relative measuring load larger than the third relative measuring load (F1);

member for applying the fourth relative measuring load (F2) in the axial direction between the stationary ring and the rotary ring;

member for additionally analyzing a spectrum frequency according to the orbital revolution frequency (fc) so as to obtain a first orbital revolution frequency (fc1) of the first bearing portion and a second orbital revolution frequency (fc2) of the second bearing portion;

member for calculating a first contact angle ($\alpha$1) of the first bearing portion and a second contact angle ($\alpha$2) of the second bearing portion on the basis of the third relative measuring load (F1), the first orbital revolution frequency (fc1), the second orbital revolution frequency (fc2) and the rotation frequency (fr) of the rotary ring; and member for adapting at least one of the first contact angle ($\alpha$1) and the second contact angle ($\delta$2) calculated by the calculating member to the preload calculating member as the contact angle ($\alpha$).

BRIEF DESCRIPTION OF THE DRAWING(S)

Figure 9:
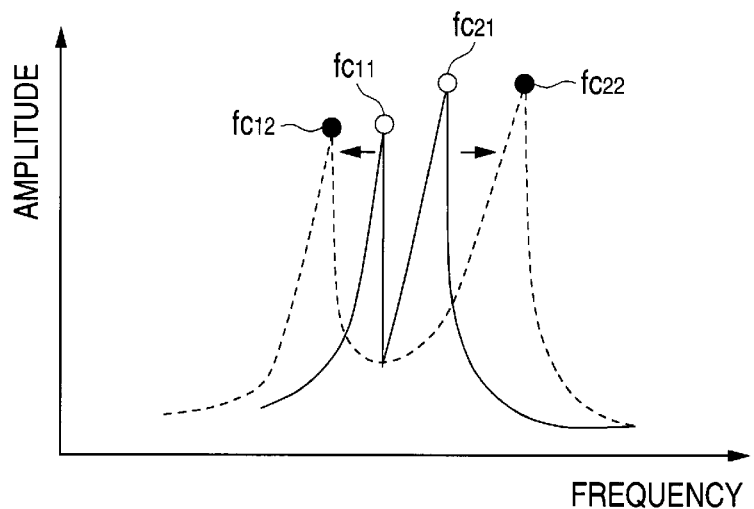
Figure 10:
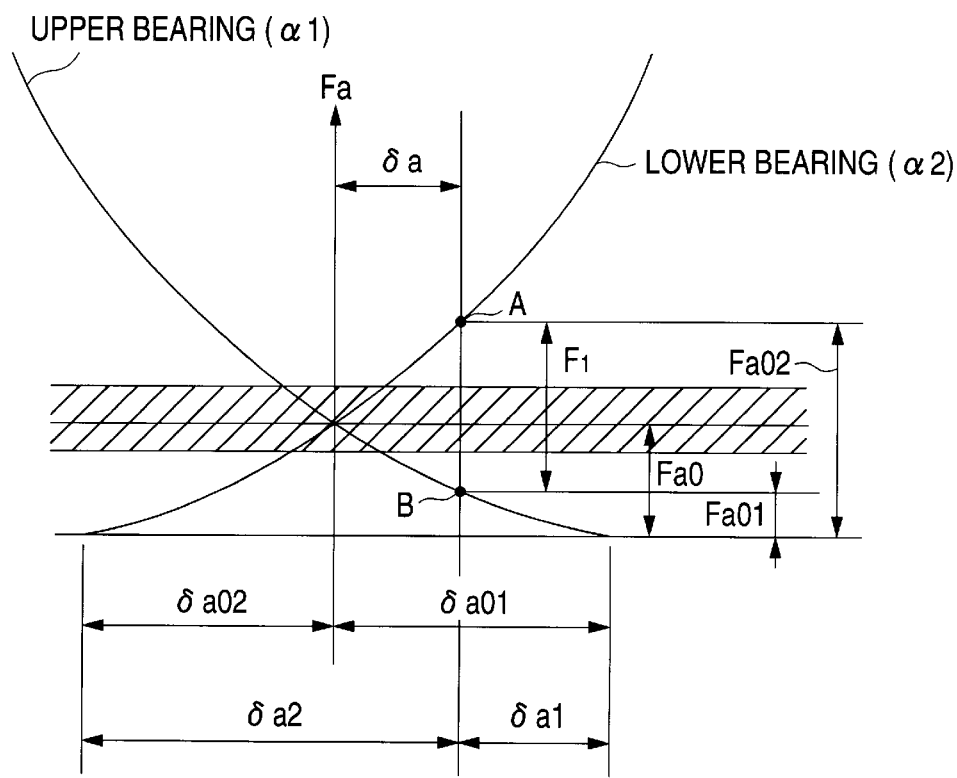

FIGS. 7(A) and 7(B) each shows a flow chart of a procedure for measuring a rigidity value KA and a contact angle $\alpha$;

FIGS. 8(A) and 8(B) are graphical representations of a vibration spectrum;

FIG. 9 is a graphical representation of variations in vibration peak components; and FIG. 10 is a graphical representation of a relation between a preload amount Fa and an axial displacement $\delta$a in a duplex bearing.

DETAILED DESCRIPTION OF PREFERRED EMBODIMENTS

Figure 1:
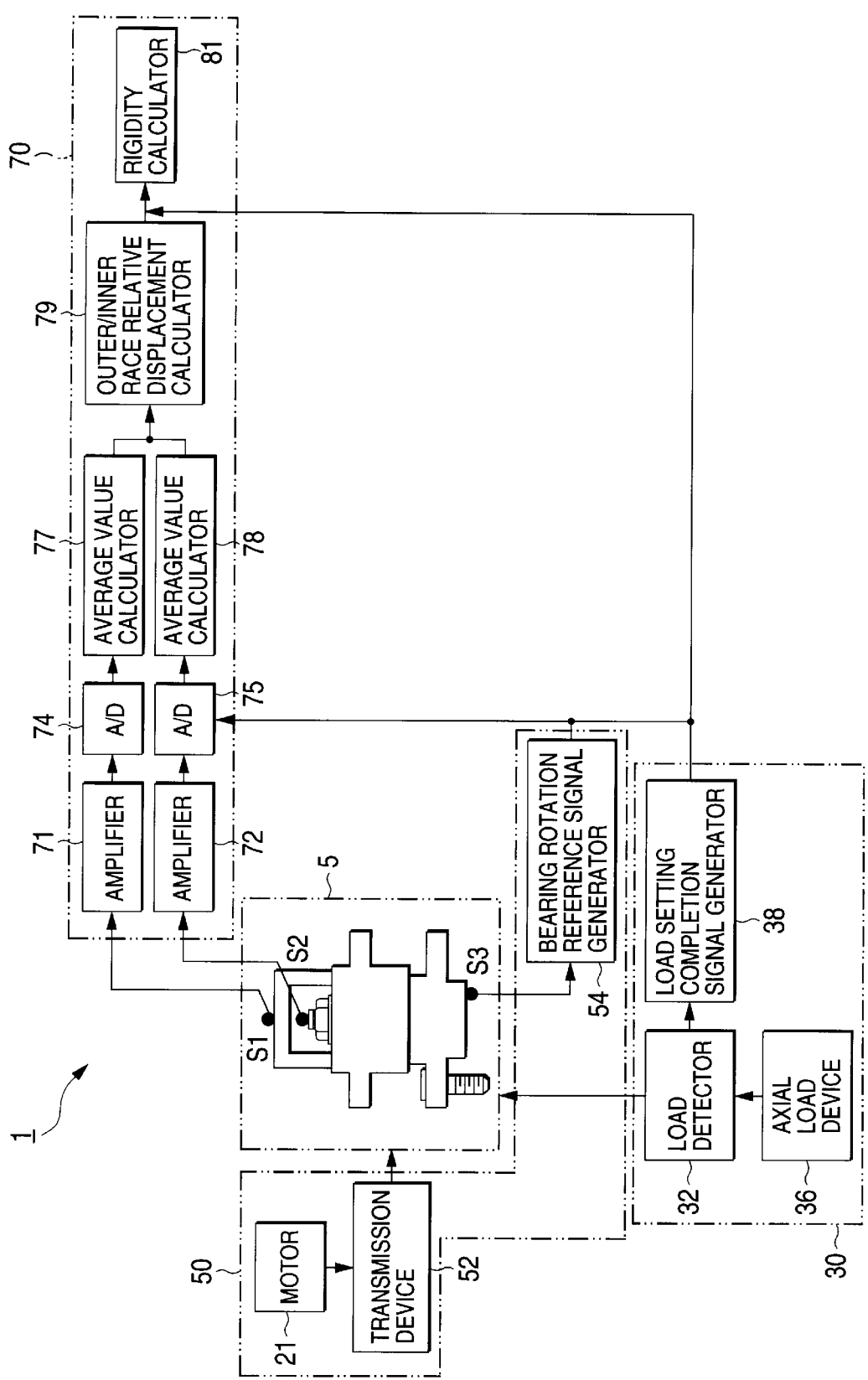
FIG. 1 is a block diagram showing the whole arrangement of a bearing preload measuring apparatus, which constitutes a preferred embodiment of the invention.

A bearing preload measuring method and apparatus, which constitutes a preferred embodiment of the invention, will be described. FIG. 1 is a block diagram showing the whole arrangement of the bearing preload measuring apparatus. As shown in FIG. 1, the bearing preload measuring apparatus 1 comprises a measuring apparatus body 5, a pressurizing section 30, a rotating section 50, and a signal processing section 70.

Figure 2:
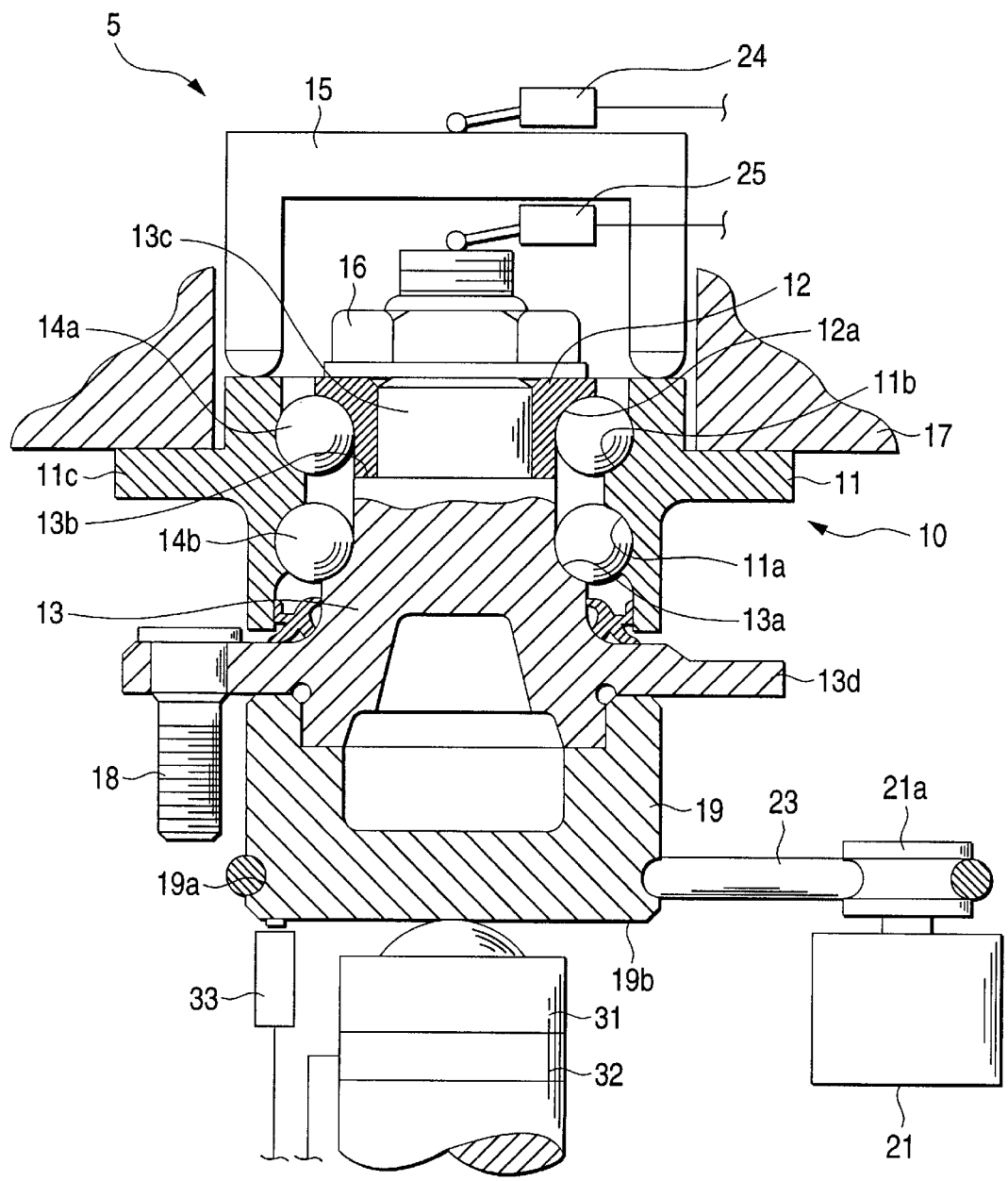
FIG. 2 is a sectional view showing the structure of a measuring apparatus body 5.

FIG. 2 is a sectional diagram showing the structure of the measuring apparatus body 5. The measuring apparatus body 5 has an axile duplex bearing 10. The axile duplex bearing 10 comprises: an outer race 11 having rolling surfaces 11a and 11b in the inner cylindrical surface which are arranged in parallel with each other; a first inner race having a rolling surface 12a in the outer cylindrical surface in such a manner that the rolling surface 12a is confronted with the rolling surface 11b of the outer race 11; a second inner race 13 having a rolling surface 13a in the outer cylindrical surface in such a manner that the rolling surface 13a is confronted with the rolling surface 11a of the outer race 11, a shoulder 13b, and a press-fitting portion 13c on which the first inner race 13 is press-fitted; balls 14a set between the outer race 11 and the first inner race 12; balls 14b set between the outer race 11 and the second inner race 12; and a nut 16 threadably engaged with the end portion of the shaft of the second inner race 13.

The outer race 11 includes a flange 11c which is secured to a block 17. The second inner race 13 includes a flange 13d in which a hub bolt 18 is fitted. The lower end portion of the second inner race 13 is coupled to a preload jig 19. The preload jig 19 has an annular groove 19a in the outer cylindrical surface. An endless belt 23 is laid over the annular groove 19a and a pulley 21a of an electric motor 21, to transmit the torque of the motor 21 to the preload jig 19. That is, as the preload jig 19 turns, the second inner race 13 and the first inner race 12 are turned.

A rod 31 is abutted against the bottom surface 19b of the preload jig 19. The-rod 31 is pressed by a cylinder (not shown), to apply an axial load to the bottom surface 19b of the preload jig 19; that is, to the first inner race 12 and the second inner race 13. In order to apply the load uniformly, the end portion of the rod 31 is made spherical. In the middle of the rod 31, a load detector 32 is provided to detect an axial load applied to the preload jig 19. The load detector 32 is a conventional load cell.

On the other hand, a cup 15 is provided on the end face of the outer race 11. A position sensor 24 is provided on the upper surface of the cup 15. The position sensor 24 is adapted to detect the amount of displacement of the outer race 11 in the direction of axis. In addition, a position sensor 25 is provided on the end face of the second inner race 13, to detect the amount of displacement of the second inner race 13 in the direction of axis. On the other hand, a rotation detecting sensor 33 is provided below the lower surface of the preload jig 19, to detect the rotational positions of the first inner race 12 and the second inner race 13.

The pressurizing section 30 comprises: an axial load device 36 including the above-described cylinder and the aforementioned cylinder rod 31; the aforementioned load detector 32 made up of a load cell; a load setting completion signal generator 38 which outputs a load setting completion signal when the axial load detected by the load detector 32 reaches a predetermined value.

A rotating section 50 comprises: the aforementioned motor 21; a transmission device 52 including the endless belt 23; a bearing rotation reference signal generator 54 which produces a reference signal in response to an output signal S3 from the rotation detecting sensor 33.

The signal processing section 70 comprises; amplifiers 71 and 72; an A/D converters 74 and 75; average value calculators 77 and 78; an outer/inner race relative displacement calculator 79, and a rigidity calculator 81. The A/D converters 74 and 75 sample the output signals S1 and S2 of the position sensors 24 and 25 which the amplifiers 71 and 72 output in synchronization with the reference signal provided by the bearing rotation reference signal generator 54. The rigidity calculator 81 is adapted to calculate the rigidity of the duplex bearing in synchronization with the load setting completion signal provided by the load setting completion signal generator 38.

Figure 3:
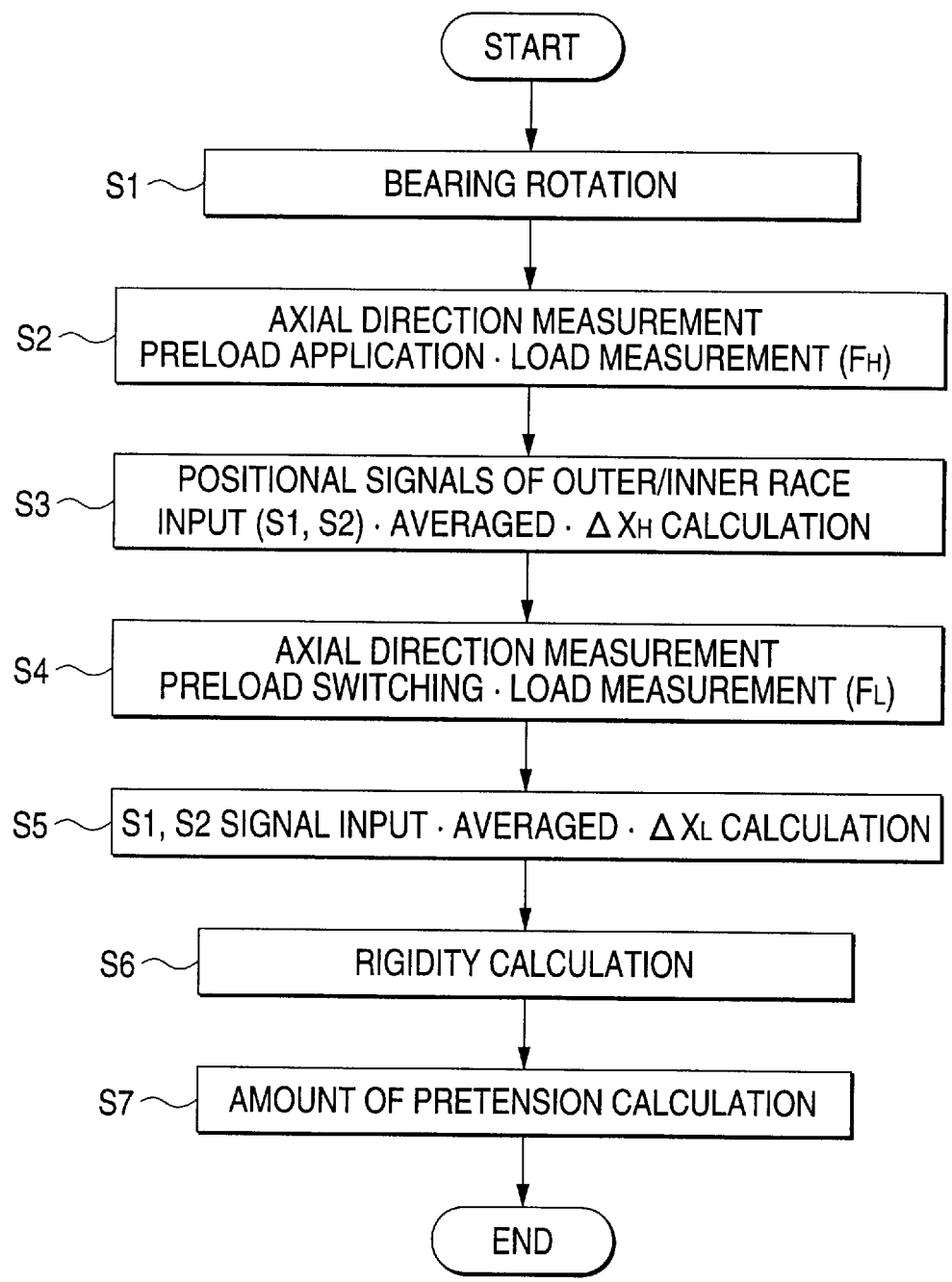
FIG. 3 is a flow chart for a description of a rigidity measuring operation with the bearing preload measuring apparatus.

Now, the operation of the bearing preload measuring apparatus thus organized will be described. FIG. 3 is a flow chart for a description of steps of measuring a rigidity with the apparatus. In advance, by tightening the nut 16 of the measuring apparatus body 5, the first and second inner races 12 and 13 are set close to each other so that the balls 14a and 14b are pressed, and a negative gap is formed with respect to the outer race 11. In addition, the line of action of the force of an axial load applied by the preload jig 19 is made coincident with the axis of rotation of the duplex bearing 10.

The motor 21 is driven, to turn the preload jig with the aid of the endless belt 23 (Step S1). A measuring load PH (kgf) applied to the preload jig 19 is set in the axial load device 36, and an axial load is applied until it reaches the measuring load FH thus set, while the axial load thus applied is detected with the load detector 32 (step S2).

Figure 4:
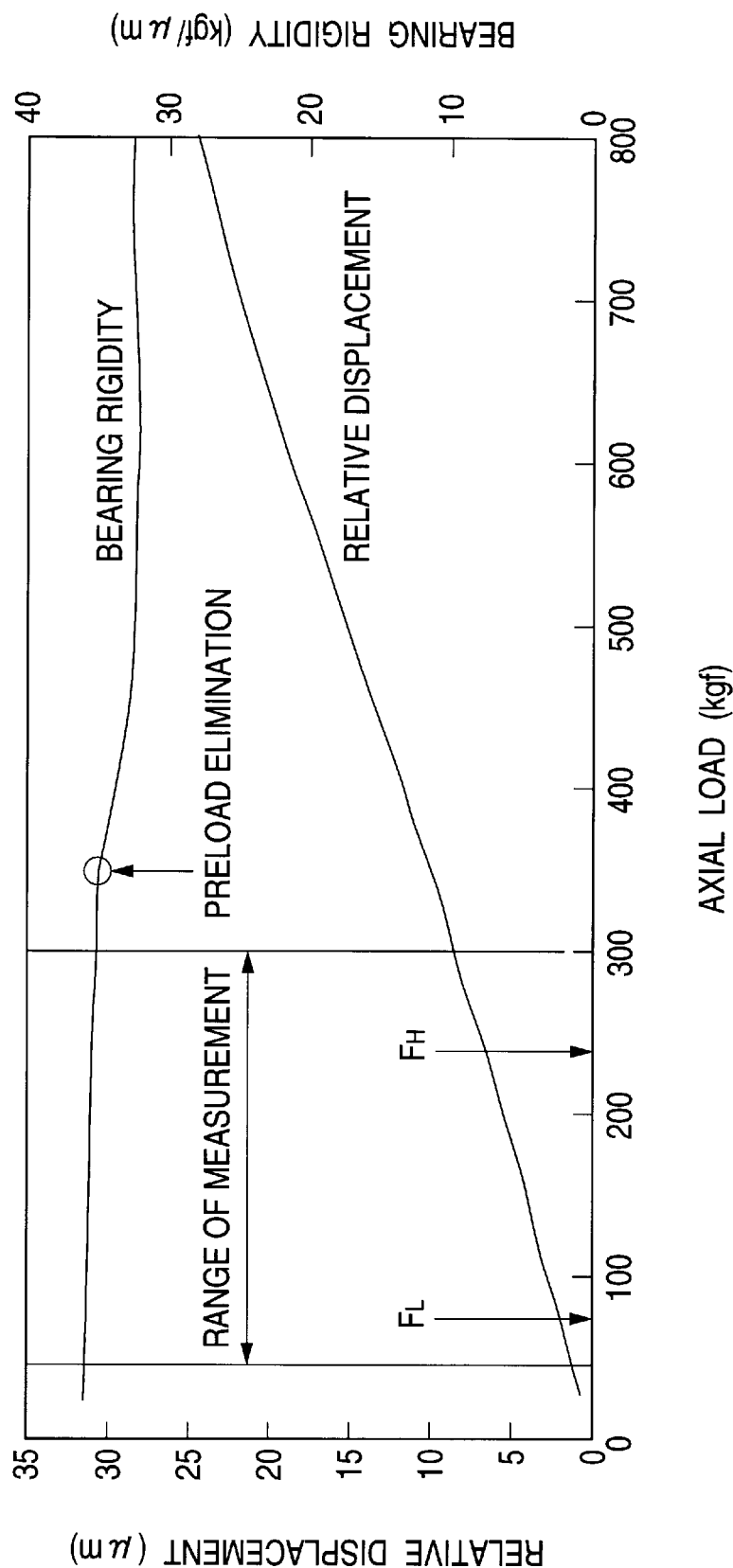
FIG. 4 is a graphical representation indicating axial load with relative displacement of outer and inner races.

FIG. 4 is a graphical representation indicating the relation between the axial load and the relative displacement of the inner and outer races. In the embodiment, the measuring loads FH and FL are set in the range of measurement in which the axial load is small before so-called "preload elimination" occurs. In the range of measurement, the relative displacement of the inner and outer races is proportional to the axial load. The term "preload elimination" as used herein is intended to mean the state that in the case where an axial load is applied with a preload applied to the first and second inner races 12 and 13, the preload is increased in the bearing on the side of the second inner race 13, while the preload is decreased in the bearing on the side of the first inner race 12, so that the formation of a gap is started.

When, in Step S2, the load detected by the load detector 32 reaches the measuring load FH set as described above, the load setting completion signal generator 38 provides a reference signal. With the reference signal as a trigger signal, the A/D converters 74 and 75 perform the analog-to-digital conversion of the output signals S1 and S2 of the position sensors 24 and 25 which have been amplified by the amplifiers 71 and 72, respectively.

The average calculators 77 and 78 average the output signals thus subjected to analog-to-digital conversion while the first and second inner races 12 and 13 make one revolution. The outer/inner race relative displacement calculator 79 calculates the amount of displacement $\Delta XH$ which is the difference between the amount of average displacement of the outer race 11 and the amount of average displacement of the second inner race 13 (Step S3). By reading the change in the relative position of the outer race 11 and the second inner race 13 in the above-described manner, the spring constant between the balls 14a and 14b and the outer race 11 can be correctly calculated. That is, if only the change in the direction of axis of the second inner race 13 is detected, then the detection value includes the change due to the contact spring between the block 17 and the bearing flange 13b, and therefore the rigidity of the bearing is not correctly evaluated. The change due to the contact spring can be canceled out by the following method: The position of the outer race 11 in the direction of axis is measured with the position sensor 24 provided on the cup 15, while the position of the second inner race 13 in the direction of axis is measured with the position sensor 25, and then the difference between those measurement values is obtained, to cancel out the change due to the contact spring.

Next, the measuring load is switched over to the measuring load FL which is smaller than the measuring load FH, and the load is detected with the load detector in the same manner (Step S4). When, in Step S4, the load detected with the load detector 32 reaches the load value FL, the A/D converters 74 and 75 perform the analog-to-digital conversion of the output signals S1 and S2 of the position sensors 24 and 25 with the reference signal as the trigger signal. The average value calculators 77 and 78 average the output signals S1 and S2, which have been subjected to analog-todigital conversion, while the first and second inner races 12 and 13 make one revolution. The outer/inner race relative displacement calculator 79 calculates the amount of displacement ΔXL which is the difference between the amount of average displacement XAL of the outer race and the amount of average displacement XBL of the inner race (Step S5).

The rigidity calculator 81 utilizes the amounts of displacements ΔXH and ΔXL to calculate a rigidity KA according to the following Equation (1) (Step S6):

$$KA = |\Delta XH - \Delta XL|/(FH - FL) \qquad (1)$$

Furthermore, the rigidity calculator 81 utilizes the rigidity KA thus calculated and the known contact angle α of the balls 14a and 14b to calculate an amount of preload P (kgf) according to the following Equation (2) (Step S7):

$$P = \alpha \times F(KA) \qquad (2)$$

where F (KA) is a function with the rigidity KA as a variable.

In the first embodiment, the known contact angle α is preferably set on a prescribed value in a standard in model Nos. of the bearing.

As was described above, with the bearing preload measuring apparatus, the change in relative position of the second inner race 13 and the outer race 11 is utilized to calculate the rigidity thereof. Hence, the rigidity of the bearing which must be high can be accurately calculated after the nut 16 has been tightened, because in this calculation elastic elements other than the contact springs between the outer race 11 and the balls 14a and 14b are not included. Thereby, a preload (Fa) of the bearing can be accurately calculated according to the rigidity thus calculated and the known contact angle (α) of the rolling elements.

Furthermore, since the measurement is carried out while -the first and second inner races 12 and 13 are being rotated, the change in rigidity corresponding to one revolution which is due to the waviness between the outer race 11 and the balls 14a and 14b can be averaged; that is, the average rigidity can be calculated which is suitable in practical use. In addition, the rotation of the first and second inner races eliminates the error in rigidity which is due to the static frictional forces between the rolling surfaces 11a and 11b of the outer race 11 and the balls 14a and 14b.

The contact elasticity between the balls 14a and 14b and the outer race 11 is directly measured. Hence, in the method of the invention, unlike the conventional excitation method, no resonance frequency is employed, and therefore the decrease in measurement accuracy does not occur which attributes to the configuration of the bearing.

In the above-described embodiment, the amount of average displacement of the inner and outer races in the direction of axis during one revolution is obtained; however, the technical concept of the invention is applicable to the case where the inner races are not turned, and the amount of displacement of the inner and outer races in the direction of axis is measured at one position. Furthermore, the preferred embodiment has been described with reference to the duplex bearing which, when assembled, a preload is applied in the direction of axis by tightening the nut; however, the invention is not limited thereto or thereby. That is, the technical concept of the invention may be equally applied to a double row bearing having a negative gap.

It is preferable that the measuring loads FH and FL are set respectively to the highest value and the lowest value of the range of measurement with which the amount of relative displacement with respect to the axial load can be regarded constant. In the case where the amount of relative displacement is large, it is preferable that the range of measurement is determined with the difference between the measuring loads FH and FL decreased. Furthermore, more than two measuring loads may be employed for the measurement of the rigidity. In this case, the measurement is further improved in accuracy.

In addition, although in the first embodiment the measuring load is switched over from the measuring load FH to the measuring load FL which is smaller than the measuring load FH, it is possible to modify the method in such a manner that the measuring load is switched over from the measuring load FH to the measuring load FL which is larger than the measuring load FH. At this time, the measuring load FL is preferably set on a value defined by a practical usage of the bearing. Namely, in particularly, a duplex bearing or a double row bearing utilized for the wheel of vehicle or the like is usually designed and assembled in such a manner that the rear surfaces of bearing portions thereof are faced with each other, because the duplex bearing or the double row bearing is requested to receive and bear a force in a lateral direction which is occurred when the vehicle runs on the curved corner and simultaneously requested to prevent the "preload elimination" from generating at this time. In addition, although the application of preload may prevent the "preload elimination" from generating, excessive preload causes an impression on the surface of the race track of the bearing which makes the bearing rolling life shorten. Therefore, it is preferable to set the measuring load FL on a value defined by a practical usage of the bearing, which is smaller than a predetermined magnitude which is applicable in design to the bearing for the wheel of the vehicle, but higher than a predetermined magnitude defined by usage conditions desired by a customer of the bearing. By setting the measuring load FL on the value defined by the practical usage of the bearing a preload generated on an actual usage of the bearing can be ensured and permitted more accurately.

Figure 5:
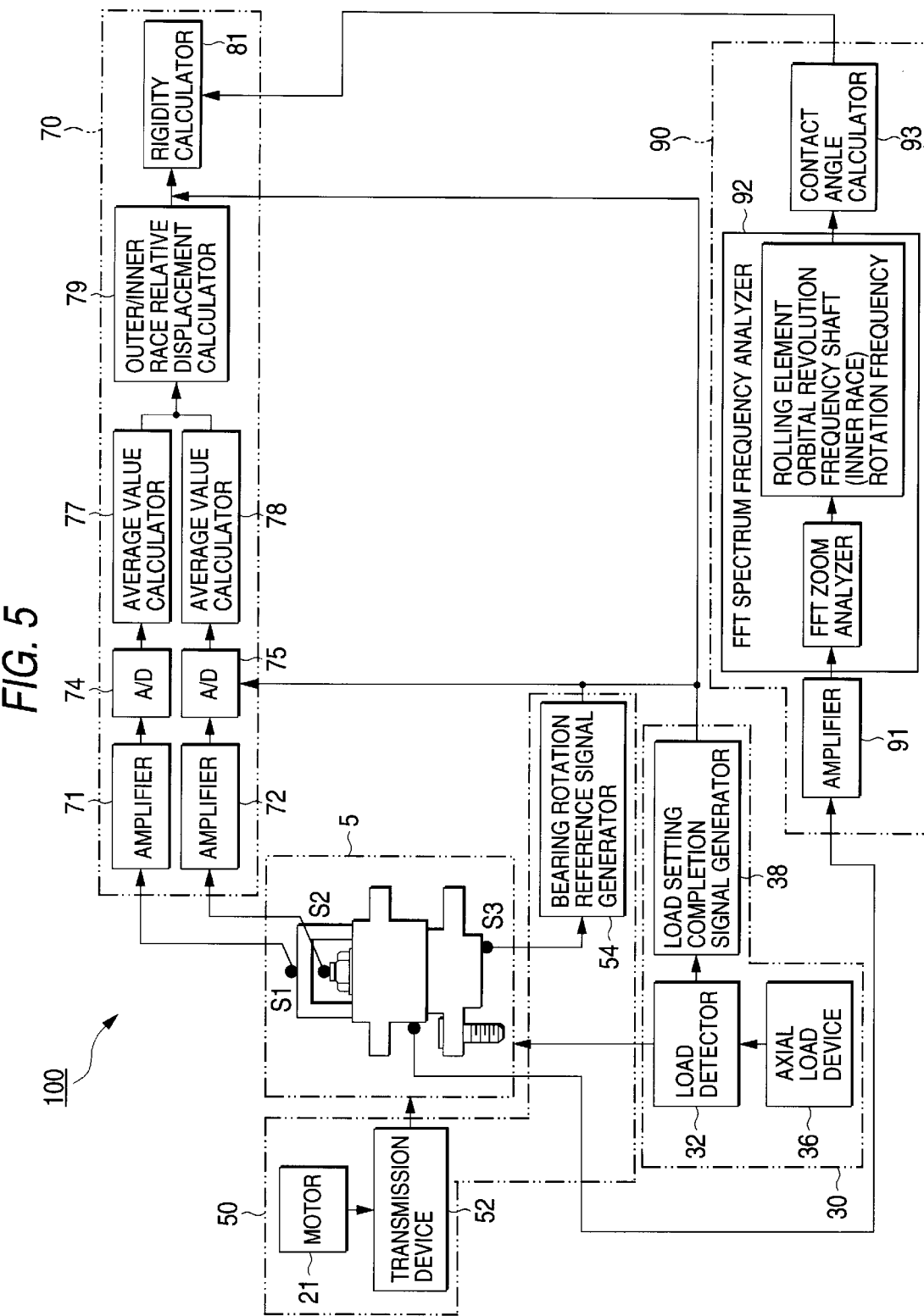
FIG. 5 is a block diagram of the whole structure of a second embodiment of a bearing preload measuring apparatus according to the invention.

Now, description will be given below of a second embodiment of a bearing preload measuring apparatus according to the invention. FIG. 5 is a block diagram of the whole structure of a bearing preload measuring apparatus according to the second embodiment of the invention. In the second embodiment, the same parts thereof as those in the previously described first embodiment are given the same designations and the description thereof is omitted here.

The second embodiment is different from the first embodiment, in which the contact angle α is a known value, in that, even when the contact angle of the rolling elements (balls) is varied due to the change of the model Nos. thereof, while measuring the contact angle α actually, a preload amount can be calculated accurately using a rigidity value KA.

The present bearing preload measuring apparatus 100 includes a contact angle calculating section 90 in addition to the structure of the first embodiment. The contact angle calculating section 90 is composed of an amplifier 91, an FFT spectrum frequency analyzer 92, and a contact angle calculator 93.

Figure 6:
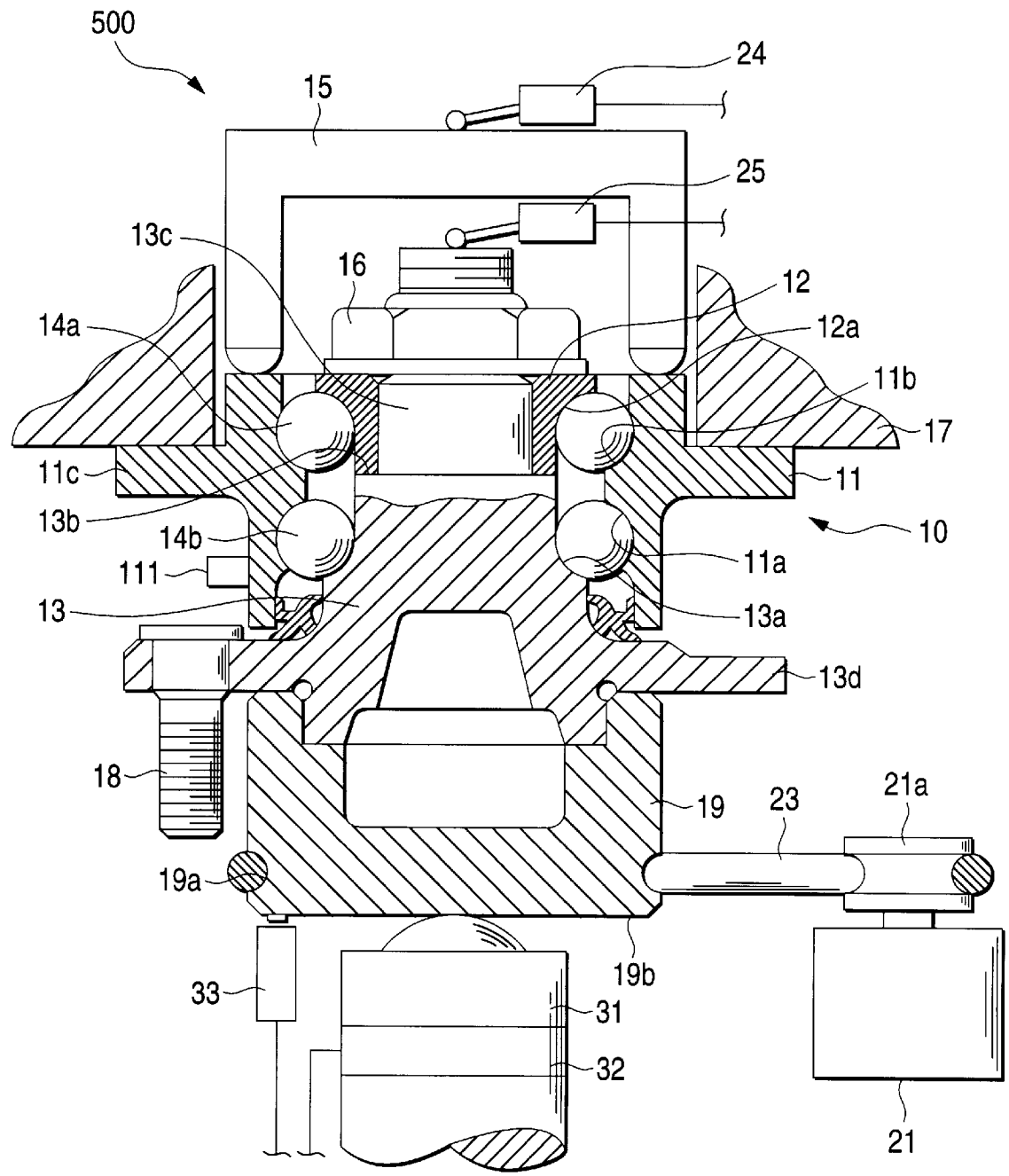
FIG. 6 is a section view of the structure of a measuring apparatus body 500 in the second embodiment.

Now, FIG. 6 is a section view of a measuring apparatus body 500 employed in the second embodiment. The same components of the measuring apparatus body 500 as those in the first embodiment are given the same designations and the description thereof is omitted here. In the present measuring apparatus body 500, on the side surface of an outer race 11 which is standing still, there is mounted a speed type vibration sensor (moving pickup) 111. The speed type vibration sensor 111 detects, through the outer race 11, vibrations caused by the orbital revolutions of balls 14a and 14b as well as the rotations of first and second inner races 12 and 13.

A vibration signal, which is generated in accordance with the vibrations detected by the speed type vibration sensor 111, is amplified by the amplifier 91 and, after then, it is input to the FFT spectrum frequency analyzer 92. The FFT spectrum frequency analyzer 92 analyzes the vibration signal to thereby obtain a vibration spectrum which shows the amplitudes of the vibration signal in the vertical axis and the frequencies thereof in the horizontal axis, and then calculates a rolling element orbital revolution frequency fc and a shaft (inner race) rotation frequency fr from the thus obtained vibration spectrum.

The contact angle calculator 93 calculates a contact angle α from the rolling element orbital revolution frequency fc and shaft (inner race) rotation frequency fr. The thus calculated contact angle α is used for calculation of a preload amount to be described later, together with a rigidity value KA that is calculated by a signal processing section 70.

Figure 7:
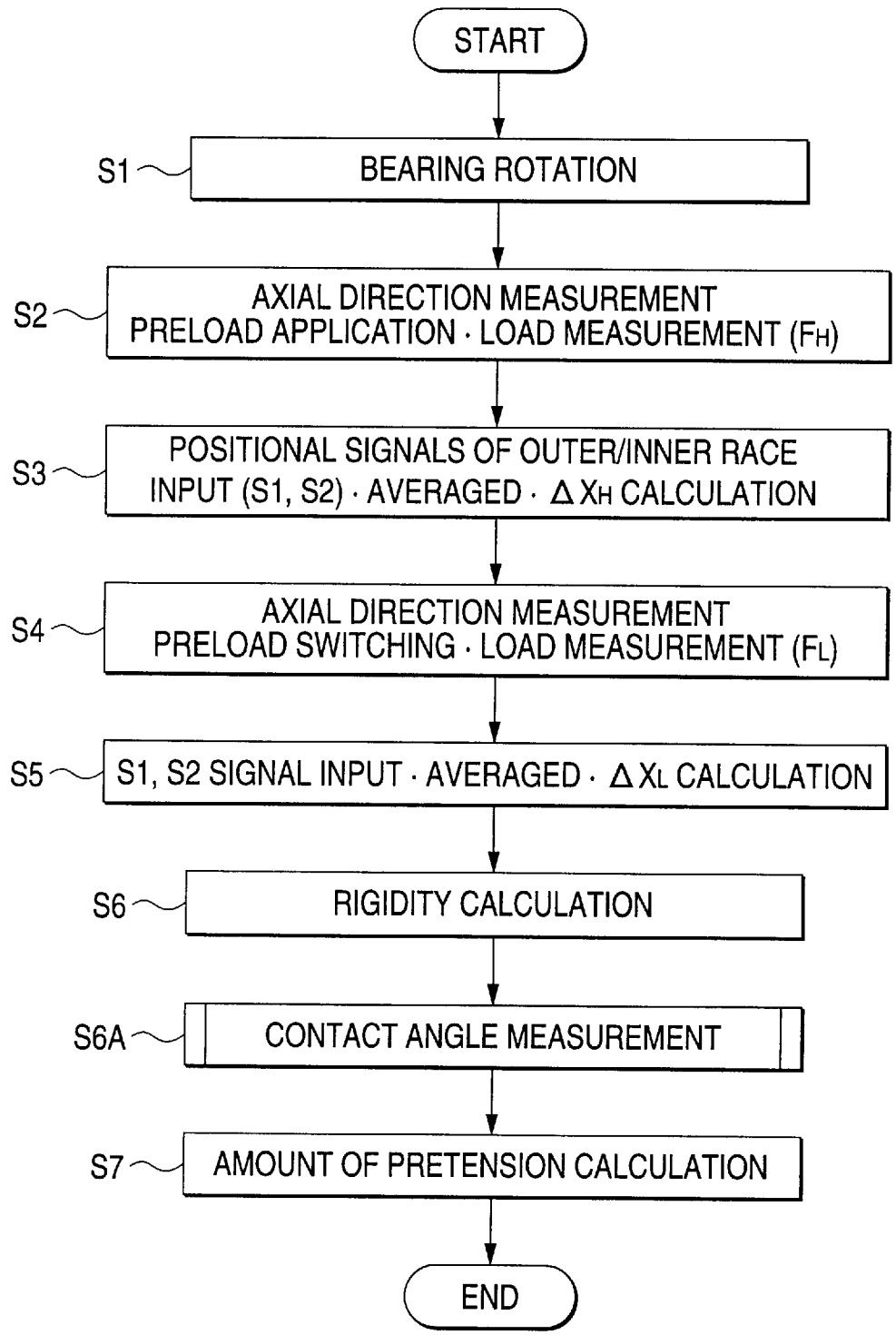
Figure 7:
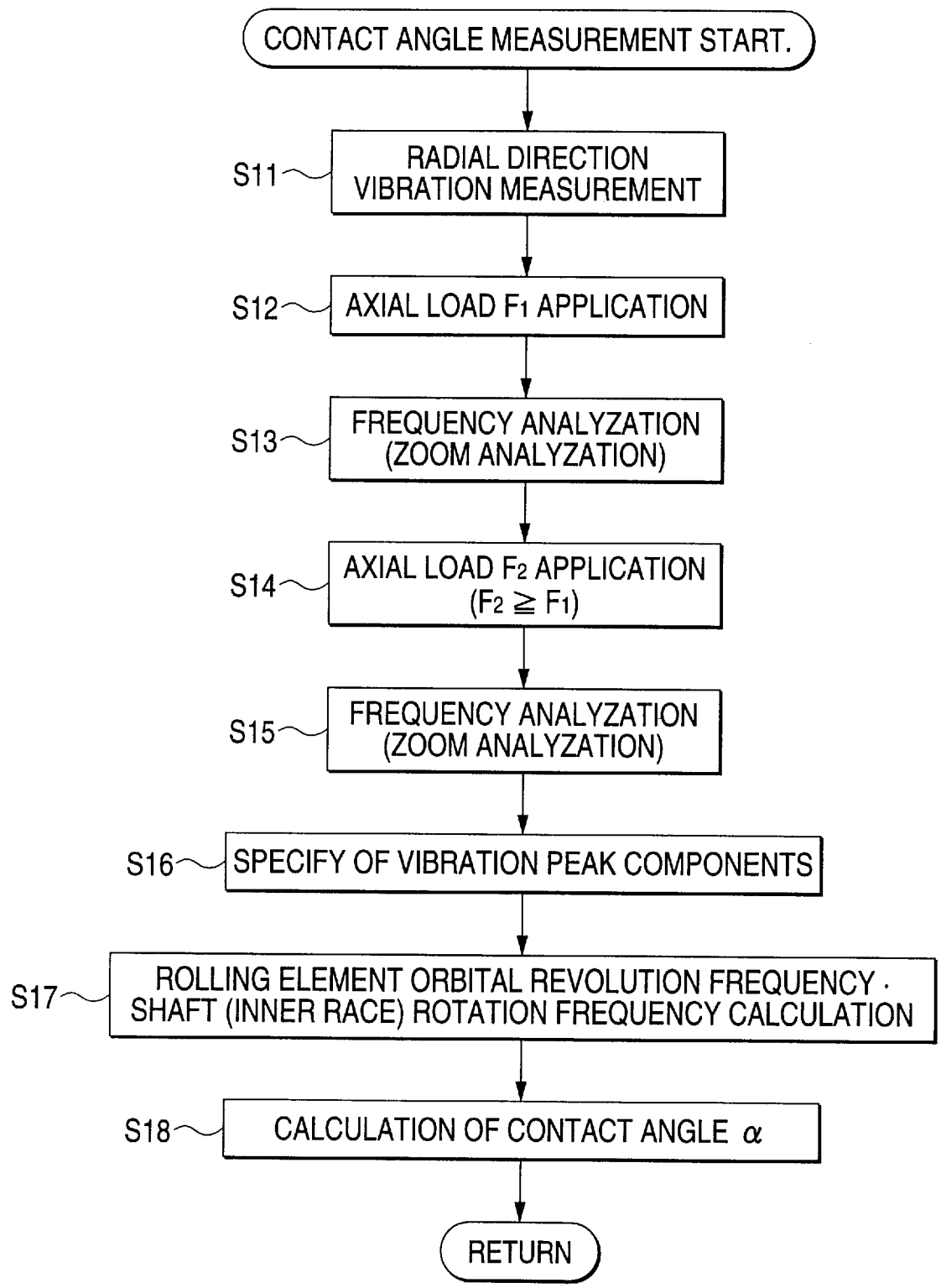

Next, description will be given below of the operation of the bearing preload measuring apparatus having the above-mentioned structure. Here, FIGS. 7(A) and 7(B) each shows a flow chart of a procedure for measuring the rigidity value KA and contact angle α. In FIGS. 7(A) and 7(B), the same step operations as in FIG. 3 are given the same step numbers. In particular, in the present bearing preload measuring apparatus, there are executed not only a procedure for calculating the rigidity value KA but also a procedure for calculating the contact angle α. The rigidity value KA, as shown in FIG. 7 (A), is calculated according to a similar operation procedure to the operation procedure to be performed in Steps S1–S6 shown in FIG. 3.

That is, previously, by tightening a nut 16 provided in the measuring apparatus body 500, the first inner race 12 and second race 13 have been set adjacent to each other in the axial direction of the measuring apparatus body 500, thereby applying a load to the balls 14a and 14b to form a negative gap with respect to the outer race. Also, the action line of a force of an axial load to be applied by a preload jig 19 is previously made coincident with the axis of rotation of a duplex bearing 10.

A motor 21 is driven to thereby rotate the preload jig 19 through a belt 23 (Step S1). In this operation, the rotation speed of the bearing is set for 1800 rpm (30 HZ).

Next, after a measuring load FH (kgf) to be applied to the preload jig 19 is set in an axial load device 36, an axial load is applied continuously until it reaches the thus set measuring load FH and, at the same time, the axial load applied is detected by a load detector 32 (Step S2). Here, the measuring loads FPH and FL are respectively set in the range of measurement in which the axial load is small before so-called "preload elimination" occurs. In this measurement range, the relative displacement of the inner and outer races is proportional to the axial load.

If the load detected by the load detector 32 in Step S2 reaches the set measuring load FH, then a load setting completion signal generator 38 generates a reference signal and A/D converters 74 and 75, with this reference signal as a trigger signal, executes sequentially the analog-to-digital conversion of output signals S1 and S2 which are output from position sensors 24 and 25 and are amplified by amplifiers 71 and 72.

Average calculators 77 and 78 average the analog-to-digital converted output signals S1 and S2 while the first and second inner races 12 and 13 make one revolution respectively. An outer/inner race relative displacement calculator 79 calculates the amount of displacement δXH which is the difference between the average displacement amount XAH of the outer race 11 and the average displacement amount XBH of the second inner race 13 (Step S3).

Next, the measuring load is switched over to the measuring load FL which is smaller than the measuring load FH, and the load is detected by the load detector 32 in a similar procedure to the above step S2 (Step S4). In Step S4, if the load detected by the load detector 32 reaches the set load FL, then A/D converters 74 and 75 executes sequentially the analog-to-digital conversion of the output signals S1 and S2 transmitted from the position sensors 24 and 25, with the reference signal as a trigger signal. The average value calculators 77 and 78 average the analog-to-digital converted output signals S1 and S2 while the first and second inner races 12 and 13 make one revolution. The outer/inner race relative displacement calculator 79 calculates the amount of displacement δXL which is the difference between the average displacement amount XAL of the outer race and the average displacement amount XBL of the inner race (Step S5).

A rigidity value calculator 81 calculates a rigidity value KA according to the above-mentioned equation (1) using the thus calculated displacement amounts δXH and δXL as well as the measuring loads FH and FL (Step S6).

Next, the contact angle α is measured (Step S6). A procedure for measuring the contact angle α is shown in FIG. 6 (B). At first, with a thrust force applied to a measurable degree, the vibration measurement in the radial direction is started by the speed type vibration sensor 111 (Step S11).

An axial load F1 (kgf) is set in the axial load device 36 and a load is applied to the preload jig 19 until the load reaches the thus set axial load F1 (Step S12).

Figure 8:
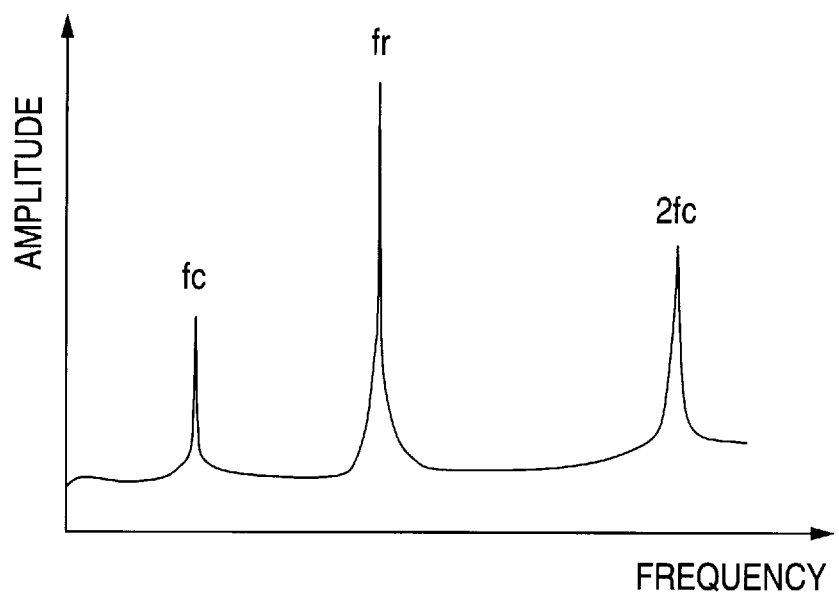
Figure 8:
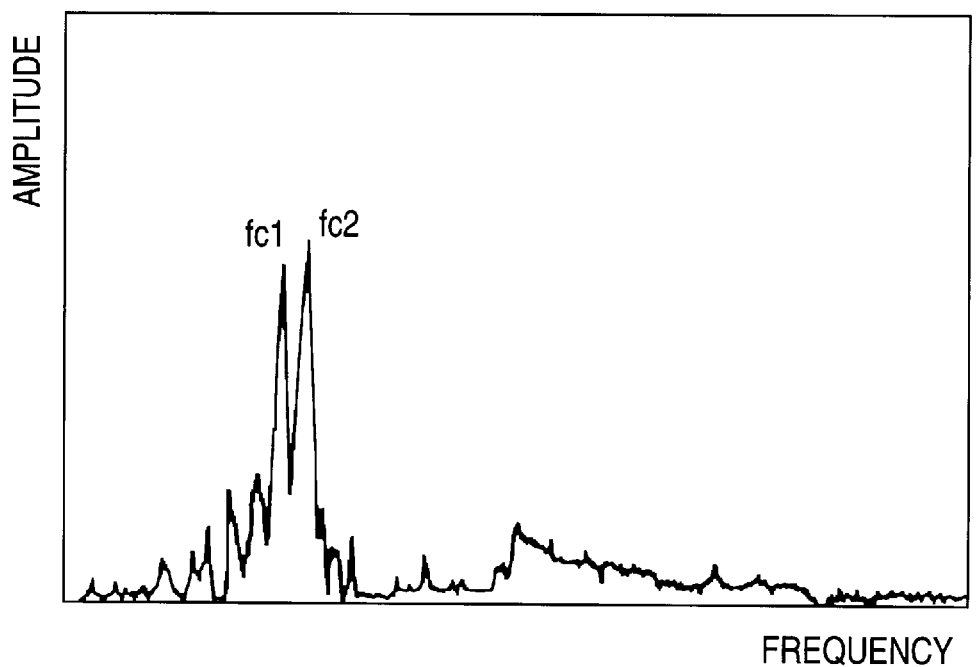

The FFT spectrum frequency analyzer 92 analyzes a vibration signal transmitted from the speed type vibration sensor 111 to thereby obtain a vibration spectrum (Step S13). Here, FIGS. 8(A) and 8(B) show the thus obtained vibration spectrum. In particular, in FIG. 8 (A), there are shown a vibration peak caused by the rolling element orbital revolution frequency fc, a vibration peak caused by the inner race rotation frequency fr, and a double vibration peak caused by the rolling element orbital revolution frequency fc.

In FIG. 8 (B), there is shown enlargedly a vibration spectrum which is obtained in the neighborhood of the rolling element orbital revolution frequency fc. The vibration peak of the rolling element orbital revolution frequency fc is divided into two vibration peak components fc1 and fc2 which are respectively caused by the upper and lower bearings of the duplex bearing 10. However, at this stage, it is not known yet which of the upper or lower bearing causes the two vibration peak components fc1 and fc2.

Next, an axial load F2 greater than the axial load F1 (kgf), (that is, F2>F1), is set in the axial load device 36, and a load is continuously applied to the preload jig 19 until the load reaches the axial load F2 (Step S14). Similarly to the above-mentioned case, the FFT spectrum frequency analyzer 92 analyzes a vibration signal transmitted from the speed type vibration sensor 111 to thereby obtain a vibration spectrum (Step S15).

In accordance with the vibration spectra respectively obtained in Steps S13 and S15, it is specified by which of the upper and lower bearings the two vibration peak components are caused (Step S16). Here, FIG. 9 shows the variations of the vibration peak components. When a preload is increasingly applied to the duplex bearing 10 from bottom in the axial direction thereof, the contact angle of the ball 14b on the lower side (on the negative load side) is increased and the rolling element orbital revolution frequency is increased, whereas the contact angle of the ball 14a on the upper side (on the anti-negative load side) is decreased and the rolling element orbital revolution frequency is decreased. That is, the upper and lower bearings are different from each other in the contact angle changing direction when the preload is changed and, therefore, by checking the moving directions of the vibration peak components, it is possible to specify by which of the upper and lower bearings the vibration peak components are caused. Accordingly, in FIG. 9, it can be specified that the vibration peak component with the rolling element orbital revolution frequency decreased (in FIG. 9, fc11→fc12) is caused by the upper bearing of the duplex bearing 10, whereas the vibration peak component with the rolling element orbital revolution frequency increased (in FIG. 9, fc21→fc22) is caused by the lower bearing.

Here, in order to check the moving directions of the vibration peak components, the previously obtained frequencies fc11 and fc21 of the vibration peak components may be stored in a memory, or they may be grasped from the afterglow of the previous display. In the above-mentioned manner, according to FIG. 9, the vibration spectra are scanned to thereby obtain the rolling element orbital revolution frequencies fc11 and fc21 as well as the inner race rotation frequency fr respectively corresponding to the vibration peak (Step S17). In this operation, the vibration peak components fc11, fc12 and fc21, fc22 may be respectively averaged to thereby find the rolling element orbital revolution frequencies fc1 and fc2, or one of the two values may be used as a representative, or they may be averaged to thereby set the averaged results as fc11 and fc21.

And, according to a following numerical equation (3), the contact angles α1 and α2 of the balls 14a and 14b are calculated (Step S18).

$$\alpha = \cos^{-1}[d0/Da(1-2fc/fr)] \quad (3)$$

where, d0 expresses the pitch circle diameter (PCD) of the bells and Da expresses the diameter of the balls.

Now, in Step S7, using the contact angle α1 of the upper bearing belonging to the ball 14a row and the contact angle α2 of the lower bearing belonging to the ball 14b row respectively obtained in the above-mentioned step S18, a preload amount being applied to the duplex bearing 10 based on the difference between the contact angles a is calculated.

However, note that the contact angle α can also be calculated by adapting the rolling element orbital revolution frequency fc and the inner race rotation frequency fr thus obtained in the Step 13 into the numerical equation (3), and then a preload amount can be calculated in Step S7 by using the contact angle α thus calculated.

At first, in a single radial bearing, a relation between an axial load and an axial direction displacement can be expressed by a following numerical equation (4).

$$\delta a = C/\sin\alpha \cdot \sqrt[3]{Q^2/Da} \quad (4)$$

where, δa: the axial direction displacement of the bearing, C: a constant, Q: a load applied to one rolling element (=Fa/Z sin α)), Fa: an axial load, Z: the number of rolling elements, α: a contact angle, and Da: the diameter of rolling elements.

If the numerical equation (4) is rearranged for a relation between Fa and δa, then there is obtained a following numerical equation (5).

$$Fa = \{C(1/Da)^{1/2} \cdot (1/Z)\}^{-1} \cdot \sin^{3/2}\alpha \cdot \delta a^{3/2} \quad (5)$$

where, $Cc = \{C(1/Da)^{1/2} \cdot (1/z)\}^{-1}$ is a known value which can be obtained if the parameters of the beating are determined and, therefore, this can be regarded as a constant.

Accordingly, the numerical equation (5) can be rearranged by a following numerical equation (6).

$$Fa = Cc \cdot \sin^{5/2}\alpha \cdot \delta a^{3/2} \quad (6)$$

If the relation of this numerical equation (6) is applied to the duplex bearing 10, then a relation shown in FIG. 10 can be obtained with respect to a test load F1 (Step S12) which is applied from outside.

If the relation of the numerical equation (6) is used, there can be obtained the displacement load curves of the upper bearing C1 and lower bearing C2 according to the relation between an axial preload and an increase in displacement with respect to the test load F1. A preload Fa0, which is applied to the duplex bearing 10 before the test, is equal in the upper and lower bearings and it can be expressed by a value on the Fa axis of a point of δa=0.

Next, if the test load F1 is newly applied to the duplex bearing 10, in the lower bearing (see FIG. 6), the initial axial displacement δa02 is increased by an axial displacement increment δa due to the test load F1 up to δa2. On the other hand, in the upper bearing, the initial axial displacement δa01 is decreased by an axial displacement increment δa due to the test load F1 down to δa1, because the preload Fa0 is on the decrease.

Here, δa2 expresses the displacement amount of the bearing C2 when the test load F1 is applied thereto if the bearing C2 is used as a single bearing, δa1 expresses the displacement amount of the bearing C1 when the test load F1 is applied thereto as a single bearing, δa expresses the displacement amount of the duplex bearing when the test load F1 is applied thereto, δa02 expresses the displacement amount of the bearing C2 when the preload Fa0 is applied thereto as a single bearing, and δa01 expresses the displacement amount of the bearing C1 when the preload Fa0 is applied thereto as a single bearing, respectively. Fa01 expresses a force which acts on the bearing C1 when the test load F1 is applied, while Fa02 expresses a force which acts on the bearing C2 when the test load F1 is applied.

With reference to FIG. 10, if thrust direction loads at points A (lower bearing C2) and B (upper bearing C1) are obtained according to the known test load F1 and are expressed using the numerical equation (6), then there are obtained the following numerical equations (7) and (8).

The thrust direction load at Point A, $$Fa02 = Cc \cdot \sin^{5/2} \cdot (\delta a02 + \delta a)^{3/2} \quad (7)$$

The thrust direction load at Point B, $$Fa01 = Fa02 - F1 = Cc \cdot \sin^{5/2}\alpha 1 \cdot (\delta a01 - \delta a)^{3/2} \quad (8)$$

Similarly, since the preload Fa0 of the duplex bearing 10 to be found is equal in the upper and lower bearings (see FIG. 10), the preload Fa0 can be expressed by a following numerical equation (9).

$$\begin{aligned} Fa0 &= Cc \cdot \sin^{5/2}\alpha 2 \cdot \delta a02^{3/2} \\ &= Cc \cdot \sin^{5/2}\alpha 1 \cdot \delta a01^{3/2} \end{aligned} \quad (9)$$

And, if the equations (7) and (8) are rearranged by eliminating Fa02, then there is obtained a following numerical equation (10).

$$A(\delta a02 + \delta a)^{3/2} = B(\delta a01 - \delta a)^{3/2} + F1 \quad (10)$$

where, $A = Cc \cdot \sin^{5/2}\alpha 2$, $B = Cc \cdot \sin^{5/2}\alpha 1$

On the other hand, from the right side relation of the equation (9), there can be obtained a relation which is shown in a following numerical equation (11).

$$A \cdot \delta a 02^{3/2} = B \cdot \delta a 01^{3/2} \quad (11)$$

where, $\alpha 11$ and $\alpha 12$ are already known in Step S18, F1 is already known in Step S12, and Cc is already known from the bearing parameters. And, since KA is already obtained in Step S6, $\delta a$ can be calculated according to a following numerical equation (12).

$$\delta a = F1/KA \quad (12)$$

Further, a following numerical equation (13) can be obtained from the numerical equation (11).

$$\delta a 02 = (B/A \cdot \delta a 01^{3/2})^{2/3} \quad (13)$$

If the equation (13) is substituted into the equation (7) and the equation is solved for $\delta a 01$ according to the relation to the equation (8), then $\delta a 01$ can be obtained. If the thus obtained $\delta a 01$ is substituted into the equation (9), then Fa0 (the preload amount of the duplex bearing 10) can be found.

Also, if $\delta a 01$ is substituted into the equation (13), then $\delta a 02$ can be obtained. That is, similarly, by substituting this value into the equation (9), Fa0 can be similarly found from the displacement load curve of the lower bearing.

As has been described hereinbefore, according to the invention, in the first embodiment, the preload amount can be calculated according to the rigidity of the duplex bearing using a known contact angle $\alpha$; and, in the second embodiment, even when the contact angle $\alpha$ of the duplex bearing varies, the contact angle can be actually measured and calculated, the preload amount of the duplex bearing can be found using the rigidity value KA obtained similarly to the first embodiment, and it is possible to judge whether the thus obtained preload amount is proper or not.

Therefore, the preload amount FPa0 of a bearing having contact angles $\alpha 1$ and $\alpha 2$ can be similarly obtained using the measured rigidity value KA, which makes it possible to judge accurately whether the preload amount is proper or not.

As described above, in the bearing preload measuring apparatus according to the present embodiment, not only the rigidity value but also the contact angle ate measured and, therefore, even when the contact angles of the balls 14a and 14b of the duplex bearing 10 vary due to the change of the model numbers thereof, the preload amount Fa0 can be calculated accurately. And, it is also possible to judge whether the thus calculated bearing preload amount Fa0 is proper or not. Thus, even in the case of a duplex bearing having a contact angle which is not known, the preload amount thereof can be calculated accurately, which can enhance the general-purpose feature of the present apparatus.

Also, in the above-mentioned embodiment, an operation to measure the contact angle is executed after execution of an operation to measure the rigidity value. However, this is not limitative but the operation to measure the contact angle may be executed before or simultaneously with the operation to measure the rigidity value. When the operations to measure the rigidity value and contact angle are executed simultaneously, the contact angle measuring operation may also be executed under the axial load which is added when the rigidity value measuring operation is executed, which can reduce the number of times of switching of the axial load, that is, the measuring operations can be finished earlier.

Further, in the second embodiment, similarly to the first embodiment, there is obtained the average displacement of the inner and outer races in the axial direction thereof during one revolution thereof. However, the invention is not limited to this but the invention can apply also when the inner and outer races are not rotated but the axial displacements of the inner and outer races are measured at a certain position. Also, the invention can be applied similarly not only to a duplex bearing to which a preload is applied in the axial direction thereof by tightening a nut when it is assembled, but also to a double row bearing in which a negative gap is formed, With the bearing preload measuring method and apparatus of the invention, in measuring the rigidity of a duplex bearing or a double row bearing in which a negative gap is formed by applying a preload to rolling elements in the direction of axis which are interposed between an inner race and an outer race, the following operations are carried out: That is, the load setting means sets the first load and the second load, the pressurizing means applies the first and second loads to at least one of the inner and outer races to increase and decrease the negative gap, the outer race displacement detecting means detects the amount of displacement of the outer race in the direction of axis to which the first and second loads have been applied, the inner race displacement detecting means detects the amount of displacement of the inner race in the direction of axis to which the first and second loads have been applied, the displacement difference calculating means calculates the difference between the amounts of displacement of the inner and outer races in the direction of axis which have been detected, and the rigidity calculating means calculates the rigidity of the bearing according to the difference between the amounts of displacements which has been calculated. That is, the rigidity is calculated from the change in relative position of the outer and inner races. Hence, the rigidity of the bearing which must be high can be accurately calculated after the nut 16 has been tightened. In this calculation, elastic elements other than the contact springs between the outer race 11 and the balls 14a and 14b are not included. Therefore, in the method of the invention, unlike the conventional excitation method, no resonance frequency is employed, and therefore the decrease in measurement accuracy does not occur which attributes to the configuration of the bearing.

Also, even when the contact angle of a duplex bearing varies actually due to the change of the model number thereof, by measuring and calculating the contact angle, the preload of the bearing (duplex bearing) can be measured and judged accurately, whack leads to enhancement of the general-purpose feature of the apparatus.

What is claimed is:

1. A bearing preload measuring method for measuring a preload of a bearing which is assembled by applying in an axial direction the preload onto at least one of the top surface and the bottom surface thereof, wherein said bearing is one of a duplex bearing and a double row bearing, said method comprising the steps of:

applying in the axial direction a first relative measuring load (FH) between the inner and outer races;

measuring an amount of first relative displacement ($\Delta$XH) in the axial direction between said inner race and said outer race which is generated by said first relative measuring load (FH);

applying in the axial direction a second relative measuring load (FL) between the inner and outer races, said second relative measuring load (FL) being different in magnitude from said first relative measuring load (FL);

measuring an amount of second relative displacement ($\Delta$XL) in the axial direction between said inner race and said outer race which is generated by said second relative measuring load (FL);

calculating a difference of displacement in the axial direction between the amount of said first relative displacement ($\Delta$XH) and the amount of said second relative displacement ($\Delta$XL); and calculating a preload of said bearing according to said difference of displacement in the axial direction through a comparative predetermined relationship between an axial load applied onto one of said duplex bearing and said double raw bearing and an axial displacement of said one which is generated by the application of said axial load.

2. The bearing preload measuring method according to claim 1, in which said inner race and said outer race are relatively rotated while said first measuring load (FH) and said second measuring load (FL) are being applied.

3. The bearing preload measuring method according to claim 1, in which said second measuring load (FL) is set on a value defined by a practical usage of said bearing.

4. A bearing preload measuring method for measuring a preload of a bearing in which a negative gap is formed by applying a preload to rolling elements in an axial direction which are interposed between an inner race and an outer race thereof, wherein said bearing is one of a duplex bearing and a double row bearing, said method comprising the steps of:

applying in the axial direction a first relative a measuring load (FH) between the inner and outer races;

measuring an amount of first relative displacement ($\Delta$XH) in the axial direction between said inner race and said outer race which is generated by said first relative measuring load (FH);

applying in the axial direction a second relative measuring load (FL) between the inner and outer races, said second relative measuring load (FL) being different in magnitude from said first relative measuring load (FL);

measuring an amount of second relative displacement ($\Delta$XL) in the axial direction between said inner race and said outer race which is generated by said second relative measuring load (FL);

calculating a difference of displacement in the axial direction between the amount of said first relative displacement ($\Delta$XH) and the amount of said second relative displacement ($\Delta$XL);

calculating a rigidity (KA) of said bearing according to said difference thus calculated; and calculating a preload (Fa) of said bearing according to said rigidity (KA) thus calculated and a contact angle ($\alpha$) of said rolling elements.

5. The bearing preload measuring method according to claim 4, in which said contact angle ($\alpha$) is a prescribed value in a standard of said bearing.

6. The bearing preload measuring method according to claim 4, wherein one of said inner race and said outer race is a stationary ring, the other one is a rotary ring, and said rolling elements are disposed between said stationary ring and said rotary ring, said method further comprising the steps of:

applying a third relative measuring load in the axial direction between said stationary ring and said rotary ring;

detecting a vibration of said stationary ring which is occurred by rotation of said rotary ring and orbital revolutions of said rolling elements and outputting a vibration signal in accordance with said vibration thus detected while said rotary ring is being rotated relative to said stationary ring;

analyzing a spectrum frequency according to said vibration signal so as to obtain an orbital revolution frequency (fc) of said rolling element and a rotation frequency (fr) of said rotary ring;

calculating said contact angle ($\alpha$) of said bearing from said orbital revolution frequency (fc) and said rotation frequency (fr); and adapting said contact angle ($\alpha$) thus calculated to said step of calculating the preload (Fa) of said bearing.

7. The bearing preload measuring method according to claim 4, wherein said bearing comprises a first and second bearing portions, each of said first and second bearing portions comprises said inner race and said outer race, one of said inner race and said outer race is a stationary ring, the other one is a rotary ring, and said rolling elements are disposed between said stationary ring and said rotary ring, in which said method further comprising the steps of:

applying a third relative measuring load in the axial direction between said stationary ring and said rotary ring;

detecting a vibration of said stationary ring which is occurred by rotation of said rotary ring and orbital revolutions of said rolling elements and outputting a vibration signal in accordance with said vibration thus detected while said rotary ring is being rotated relative to said stationary ring;

analyzing a spectrum frequency according to said vibration signal so as to obtain an orbital revolution frequency (fc) of said rolling element and a rotation frequency (fr) of said rotary ring;

applying a fourth relative measuring load (F2) larger than said third relative measuring load (F1) in the axial direction between said stationary ring and said rotary ring;

additionally analyzing a spectrum frequency according to said orbital revolution frequency (fc) so as to obtain a first orbital revolution frequency (fc1) of said first bearing portion and a second orbital revolution frequency (fc2) of said second bearing portion;

calculating a first contact angle ($\alpha$1) of said first bearing portion and a second contact angle ($\alpha$2) of said second bearing portion on the basis of said third relative measuring load (F1), said first orbital revolution frequency (fc1), said second orbital revolution frequency (fc2) and said rotation frequency (fr) of said rotary ring; and adapting at least one of said first contact angle ($\alpha$1), said second contact angle ($\alpha$2) to said step of calculating the preload (Fa) of said bearing as said contact angle ($\alpha$).

8. The bearing preload measuring method according to claim 4, wherein said measuring stop of the amount of first relative displacement ($\Delta$XH), and said measuring step of the amount of second relative displacement ($\Delta$XL) are conducted while said inner race and said outer race are relatively rotated.

9. A bearing preload measuring apparatus adapted to measure the preload of a bearing in which a negative gap is formed by applying a preload to rolling elements in the direction of axis which are interposed between an inner race and an outer race, wherein said bearing is one of a duplex bearing and a double row bearing, said apparatus comprising:

load setting means for setting a first relative measuring load and a second relative measuring load;

pressurizing means for applying said first and second relative measuring loads between said inner and outer races to increase and decrease said negative gap;

a displacement detecting means for detecting an amount of first relative displacement between said inner and outer races in an axial direction while said first relative measuring loads are being applied and also detecting an amount of second relative displacement between said inner and outer races in an axial direction while said second relative measuring loads are being applied;

displacement difference calculating means for calculating a difference between the amounts of first and second relative displacement in the axial direction;

rigidity calculating means for calculating a rigidity of said bearing according to said difference thus calculated; and a preload calculating means for calculating a preload (Fa) of said bearing according to said rigidity (KA) thus calculated and a contact angle ($\alpha$) of said rolling elements.

10. The bearing preload measuring apparatus according to claim 9, in which said contact angle ($\alpha$) is a prescribed value in a standard of said bearing.

11. The bearing preload measuring apparatus according to claim 9, further including a means for calculating said contact angle ($\alpha$) which comprises:

load setting means for setting a third relative measuring load;

means for applying said third relative measuring load in the axial direction between said inner race and said outer race;

means for relatively rotating one of said inner race and said outer race in such a manner that the one of said inner race and said outer race defines a stationary ring and the other one defines a rotary ring;

means mounted on said stationary ring for detecting a vibration of said stationary ring which is occurring by both a rotation of said rotary ring and orbital revolutions of said rolling elements and outputting a vibration signal in accordance with said vibration thus detected while said rotary ring is being rotated relative to said stationary ring;

means for analyzing a spectrum frequency according to said vibration signal so as to obtain an orbital revolution frequency (fc) of said rolling element and a rotation frequency (fr) of said rotary ring;

means for calculating said contact angle ($\alpha$) of said bearing from said orbital revolution frequency (fc) and said rotation frequency (fr); and means for adapting said contact angle ($\alpha$) calculated by said calculating means to said preload calculating means.

12. The bearing preload measuring apparatus according to claim 9, wherein said bearing comprises a first and second bearing portions, each of said first and second bearing portions comprises said inner race and said outer race, one of said inner race and said outer race is a stationary ring, the other one is a rotary ring, and said rolling elements are disposed between said stationary ring and said rotary ring, in which said apparatus further includes a means for calculating said contact angle ($\alpha$) which comprises:

load setting means for setting a third relative measuring load;

means for applying said third relative measuring load in the axial direction between said inner race and said outer race;

means for relatively rotating one of said inner race and said outer race in such a manner that the one of said inner race and said outer race defines a stationary ring and the other one defines a rotary ring;

means mounted on said stationary ring for detecting a vibration of said stationary ring which is occurred by both a rotation of said rotary ring and orbital revolutions of said rolling elements and outputting a vibration signal in accordance with said vibration thus detected while said rotary ring is being rotated relative to said stationary ring;

means for analyzing a spectrum frequency according to said vibration signal so as to obtain an orbital revolution frequency (fc) of said rolling element and a rotation frequency (fr) of said rotary ring;

additional load setting means for setting a fourth relative measuring load larger than said third relative measuring load (F1);

means for applying said fourth relative measuring load (F2) in the axial direction between said stationary ring and said rotary ring;

means for additionally analyzing a spectrum frequency according to said orbital revolution frequency (fc) so as to obtain a first orbital revolution frequency (fc1) of said first bearing portion and a second orbital revolution frequency (fc2) of said second bearing portion;

means for calculating a first contact angle ($\alpha$1) of said first bearing portion and a second contact angle ($\alpha$2) of said second bearing portion on the basis of said third relative measuring load (F1), said first orbital revolution frequency (fc1), said second orbital revolution frequency (fc2) and said rotation frequency (fr) of said rotary ring; and means for adapting at least one of said first contact angle ($\alpha$1) and said second contact angle ($\alpha$2) calculated by said calculating means to said preload calculating means as said contact angle ($\alpha$).

* * * * *